United States Patent
Cho et al.

(10) Patent No.: US 9,215,573 B2
(45) Date of Patent: Dec. 15, 2015

(54) METHOD FOR TRANSMITTING SHORT MESSAGES IN A BROADBAND WIRELESS ACCESS SYSTEM

(75) Inventors: Hee Jeong Cho, Anyang-si (KR); Young Soo Yuk, Anyang-si (KR); Yong Ho Kim, Anyang-si (KR); Ki Seon Ryu, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 850 days.

(21) Appl. No.: 13/513,499

(22) PCT Filed: Dec. 2, 2010

(86) PCT No.: PCT/KR2010/008580
§ 371 (c)(1),
(2), (4) Date: Sep. 12, 2012

(87) PCT Pub. No.: WO2011/068366
PCT Pub. Date: Jun. 9, 2011

(65) Prior Publication Data
US 2013/0005342 A1    Jan. 3, 2013

Related U.S. Application Data

(60) Provisional application No. 61/265,765, filed on Dec. 2, 2009, provisional application No. 61/266,161, filed on Dec. 3, 2009.

(30) Foreign Application Priority Data

Dec. 2, 2010  (KR) .................. 10-2010-0121820

(51) Int. Cl.
*H04W 36/00* (2009.01)
*H04W 4/14* (2009.01)

(52) U.S. Cl.
CPC ............ *H04W 4/14* (2013.01); *H04W 36/0077* (2013.01)

(58) Field of Classification Search
CPC ........................... H04W 4/14; H04W 36/0077
USPC ................................................. 455/438–445
See application file for complete search history.

(56) References Cited

U.S. PATENT DOCUMENTS

| | | | |
|---|---|---|---|
| 2006/0203712 A1* | 9/2006 | Lim et al. ...................... | 370/208 |
| 2007/0293244 A1* | 12/2007 | Lee et al. .................... | 455/456.5 |
| 2008/0031128 A1* | 2/2008 | Jang et al. .................... | 370/210 |
| 2012/0036443 A1* | 2/2012 | Ohmori et al. ................ | 715/736 |
| 2015/0105053 A1* | 4/2015 | Ramkumar ................ | 455/412.1 |

FOREIGN PATENT DOCUMENTS

| KP | 10-1017971 | 3/2011 |
|---|---|---|
| KR | 10-0901375 | 6/2009 |

* cited by examiner

*Primary Examiner* — Shahriar Behnamian
(74) *Attorney, Agent, or Firm* — Birch, Stewart, Kolasch & Birch, LLP

(57) ABSTRACT

The present invention relates to a method enabling a base station and a terminal to reliably transmit short messages in a broadband wireless access system. According to one embodiment of the present invention, the method wherein a terminal receives a short message service (SMS) in a broadband wireless access system comprises the following steps: transmitting a first message for carrying out ranging to a base station; receiving a second message, which comprises SMS information and uplink resource allocation information for the transmission of a third message, from the base station as a response to the first message; and transmitting a third message, which indicates the state of the reception of the second message, to the base station by means of uplink resources which are indicated by the uplink resources allocation information.

9 Claims, 12 Drawing Sheets

METHOD FOR TRANSMITTING SHORT MESSAGES IN A BROADBAND WIRELESS ACCESS SYSTEM

CROSS REFERENCE TO RELATED APPLICATIONS

This application is the National Phase of PCT/KR2010/008580 filed on Dec. 2, 2010, which claims priority under 35 U.S.C. 119(e) to U.S. Provisional Application No. 61/265,765 filed on Dec. 2, 2009 and to U.S. Provisional Application No. 61/266,161 filed on Dec. 3, 2009 and under 35 U.S.C. 119(a) to Patent Application No. KR-10-2010-0121820 filed in Korea on Dec. 2, 2010, all of which are hereby expressly incorporated by reference into the present application.

TECHNICAL FIELD

The present invention relates to a broadband wireless access system, and more particularly, to a method for enabling a base station and a mobile station to perform reliable short message service transmission.

BACKGROUND ART

Initial ranging means a procedure of controlling transmission parameters (frequency offset, time offset, transmission power) for uplink communication between a mobile station and a base station during an initial network registration. After performing the network registration procedure, the mobile station performs periodic ranging to continue to maintain uplink communication with the base station. In addition, an example of ranging includes handover ranging for simplifying a procedure during a handover operation of a mobile station.

In a broadband wireless access system, a CDMA code (or ranging preamble) set that can be used for ranging depending on ranging types and a region for transmitting CDMA codes are allocated through a channel (for example, UL-MAP in case of 802.16e system and SFH in case of 802.16m system), which broadcasts system information, by a network. Accordingly, in order to perform handover ranging, a specific mobile station selects a specific code from CDMA codes for handover ranging and transmits the selected code to the base station through initial ranging and handover ranging regions, i.e., ranging opportunity, thereby requesting ranging. In this case, the network may identity a type of ranging through the received CDMA code and a region to which the CDMA code is transmitted.

A ranging acknowledgement response (AAI_RNG-ACK) message and a CDMA allocation map information element (CDMA Allocation A-MAP IE) are used for the ranging procedure, wherein the ranging acknowledgement response message is to notify the mobile station whether the base station has received the ranging code received during the ranging procedure, and the CDMA allocation map information element is to transfer resource allocation information for the successfully received ranging code to the mobile station that has transmitted the corresponding code.

Hereinafter, an idle mode of a mobile station and a paging group related to the embodiments of the present invention will be described in brief.

The idle mode generally refers to an operation for enabling downlink (DL) broadcast traffic reception to be periodically performed although a mobile station is not registered in a specific base station, when the mobile station is moved in a radio link environment including multiple base stations.

If the mobile station does not receive traffic from the base station for a predetermined time, the mobile station may be shifted to the idle mode for power saving. The mobile station which has shifted to the idle mode may receive a broadcast message (for example, a paging message) transmitted by the base station for an available interval and determine whether the mobile station shifts to a normal mode or is in the idle mode. In addition, the mobile station which is in the idle mode performs location update so as to inform a paging controller of its location.

The idle mode may eliminate demands for activation associated with handover and demands for a general operation so as to provide benefits to the mobile station. The idle mode may restrict the activity of the mobile station to be scanned in a discrete period so as to reduce power consumption and operational resources used by the mobile station.

In addition, the idle mode may provide a simple appropriate scheme for informing a mobile station of pending downlink traffic, and eliminate radio interface and network handover (HO) traffic from an inactive mobile station so as to provide benefits to a network and a base station.

Paging refers to a function for recognizing the location (for example, any base station or any mobile switching center) of a Mobile Station (MS) when an incoming signal occurs in mobile communication. A plurality of Base Stations (BSs) for supporting the idle mode may be included in a specific paging group so as to configure a paging area.

The paging group may include at least one base station BS. One base station may be included in one or more paging groups. A paging controller may manage a list of mobile stations, which are in the idle mode, using a paging-announce message which is one of backbone network messages, and manage initial paging of all the base stations BSs belonging to the paging group.

In order to increase a hit ratio of paging, the mobile station may perform a location update procedure. Location update. In this case, the location update is an operation of the mobile station to increase the hit ratio of the paging to the mobile station having entered the idle mode and indicates a process for a mobile station to report a new location or region, which is entered by the mobile station when the mobile station moves into a new region, to a network. Such a location update procedure may be performed through the aforementioned ranging procedure. In other words, the location update procedure may be performed in a manner that ranging preamble and ranging MAC message (that is, a ranging request (RNG-REQ) message and a ranging response (RNG-RSP) message) are exchanged between the mobile station and the base station.

Hereinafter, an example of a procedure of enabling a mobile station to enter an idle mode in a general IEEE 802.16 system will be described with reference to FIG. 1.

Referring to FIG. 1, the mobile station transmits a deregistration request (DREG-REQ) message to a serving base station to switch a normal mode to the idle mode (S101).

The serving base station which has received the deregistration request (DREG-REQ) message may transmit or receive mobile station information and serving base station information to or from a paging controller. In other words, the serving base station may inform the paging controller of an ID of a mobile station which enters the idle mode and an ID of the serving base station. In addition, the paging controller may inform the serving base station of a paging group ID (PG ID) or a paging controller ID (PC ID). The paging group ID or the paging controller ID may be used to transmit or receive a paging message (S102).

Next, the serving base station may transmit a deregistration command (DREG-CMD) message to the mobile station in response to the deregistration request message. The deregistration command message may include paging information. At this time, the paging information may include a paging cycle parameter, a paging offset parameter and a paging listen interval parameter. In addition, the deregistration command message may further include a paging controller ID and a Paging Group (PG) ID (S103).

The mobile station which has received DREG-CMD message may enter the idle mode by confirming that an idle mode entry request has been successfully accepted. The mobile station may receive the paging message on the basis of the paging information received through the DREG-CMD message. That is, the mobile station may monitor a radio channel so as to determine whether a paging message is transmitted thereto during the paging listen interval. During the remaining interval of the paging cycle, the mobile station operates in a sleep mode or a radio turn-off mode so as to reduce power consumption (S104).

A call or an external packet may be input to the paging controller (S105).

Accordingly, the paging controller may perform a paging procedure for paging the mobile station. At this time, the paging controller may transfer a paging announcement message to all the base stations within the paging group (S106).

All the base stations in the paging group, which have received the paging message, may broadcast an MOB_PAG-ADV message to all the mobile stations managed by them (S107).

The mobile station confirms the MOB_PAG-ADV message, and enters the normal mode and performs communication with the serving base station when the paging controller performs paging with respect to the mobile station (S108 and S109).

However, in the IEEE 802.16m system, the mobile station and the base station exchange a short message service (SMS) by using a second layer transmission (AAI_L2-XFER) message. The mobile station which has entered the aforementioned idle mode may transmit the SMS to the base station through the ranging request message during a location update procedure or a network reentry procedure or receive the SMS from the base station through the ranging response message. However, a procedure of enabling a transmitter to efficiently know whether a receiver has successfully received SMS transmitted through ranging request/response messages has not been defined.

DISCLOSURE

Technical Problem

The present invention has been devised to solve the conventional problem, and an object of the present invention is to provide a method for transmitting a short message service more reliably.

Another object of the present invention is to provide a method for enabling a mobile station, which operates in an idle mode, to reliably transmit or receive a short message service.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one embodiment of the present invention, a method for receiving a short message service (SMS) in a mobile station of a broadband wireless access system comprises the steps of transmitting a first message for performing ranging to a base station; receiving a second message, which includes SMS information and uplink resource allocation information for transmission of a third message, from the base station in response to the first message; and transmitting a third message, which indicates the state of the reception of the second message, to the base station through uplink resources which are indicated by the uplink resources allocation information.

In this case, the mobile station operates in an idle mode, and the method may further comprise the steps of receiving a paging advertisement (AAI_PAG-ADV) message indicating that location update should be performed; transmitting a handover ranging code to the base station; and receiving uplink allocation information for transmission of the first message from the mobile station, from the base station.

Also, if the transmission of the third message is failed, the method may further comprise the steps of performing network reentry to the base station; and receiving the SMS information from the base station through the second message or second layer transmission (AAI_L2-XFER) message.

In addition, the SMS information includes index having different values per SMS, and the method may further comprise the steps of comparing an index value of the SMS information included in the second message with an index value of SMS information which is previously received; and deleting the SMS information included in the second message or the previously received SMS information if the index values are the same as each other.

To solve the aforementioned technical problems, according to another embodiment of the present invention, a method for transmitting a short message service (SMS) from a base station to a mobile station in a broadband wireless access system comprises the steps of receiving a first message for performing ranging from the mobile station; transmitting a second message, which includes SMS information and uplink resource allocation information for transmission of a third message from the mobile station, to the mobile station in response to the first message; and receiving a third message, which indicates the state of the reception of the second message, from the mobile station through uplink resources which are indicated by the uplink resources allocation information.

In this case, the mobile station operates in an idle mode, the method may further comprise the steps of transmitting a paging advertisement (AAI_PAG-ADV) message indicating that location update should be performed, for a paging interval of the mobile station; receiving a handover ranging code from the mobile station; and transmitting uplink allocation information for transmission of the first message from the mobile station, to the mobile station if the ranging code is successfully received.

Also, if the third message is not received successfully for the paging interval, the method may further comprise the steps of performing network reentry of the mobile station; and transmitting the SMS information to the mobile station through the second message or second layer transmission (AAI_L2-XFER) message.

In addition, the SMS information includes index having different values per SMS, and the method may further comprise the step of transmitting SMS information having the same index value as that of the SMS information included in the second message to the mobile station for next interval if the third message is not received successfully for the paging interval.

To solve the aforementioned technical problems, according to other embodiment of the present invention, a mobile station for receiving a short message service (SMS) in a broadband wireless access system comprises a processor; and a radio frequency (RF) module for transmitting and receiving a radio signal to and from the outside under the control of the processor, wherein the processor transmits a first message for performing ranging to a base station, receives a second message, which includes SMS information and uplink resource allocation information for transmission of a third message, from the base station in response to the first message, and transmits a third message, which indicates the state of the reception of the second message, to the base station through uplink resources which are indicated by the uplink resources allocation information.

In this case, the mobile station operates in an idle mode, and the processor transmits a handover ranging code to the base station if a paging advertisement (AAI_PAG-ADV) message, which indicates that location update should be information for transmission of the first message from the mobile station, from the base station.

Also, if the transmission of the third message is failed, the processor performs network reentry to the base station, and receives the SMS information from the base station through the second message or second layer transmission (AAI_L2-XFER) message.

In addition, the SMS information includes index having different values per SMS, and the processor compares an index value of the SMS information included in the second message with an index value of SMS information which is previously received, and deletes the SMS information included in the second message or the previously received SMS information if the index values are the same as each other.

Preferably, in the aforementioned embodiments, the first message is a ranging request (AAI_RNG-REQ) message, the second message is a ranging response (AAI_RNG-RSP) message, and the third message is a message acknowledgement (AAI_MSG-ACK) message.

Also, in the aforementioned embodiments, HARQ feedback information for the second message may be used instead of the third message.

In addition, in the aforementioned embodiments, if resource allocation information for transmission of the third message is not included in the second message, the resource for transmission of the third message may be determined by referring to information on a resource region to which the first message or the second message is transmitted.

Advantageous Effects

According to the embodiments of the present invention, the following advantages may be obtained.

First of all, as the embodiments of the present invention are used, reliable SMS transmission may be performed.

In addition, the mobile station and the base station which operate in an idle mode may reliably transmit and receive SMS to and from each other.

It will be appreciated by persons skilled in the art that the effects that could be achieved with the present invention are not limited to what has been particularly described hereinabove and other advantages of the present invention will be more clearly understood from the following detailed description.

BEST MODE FOR CARRYING OUT THE INVENTION

Figure 1:
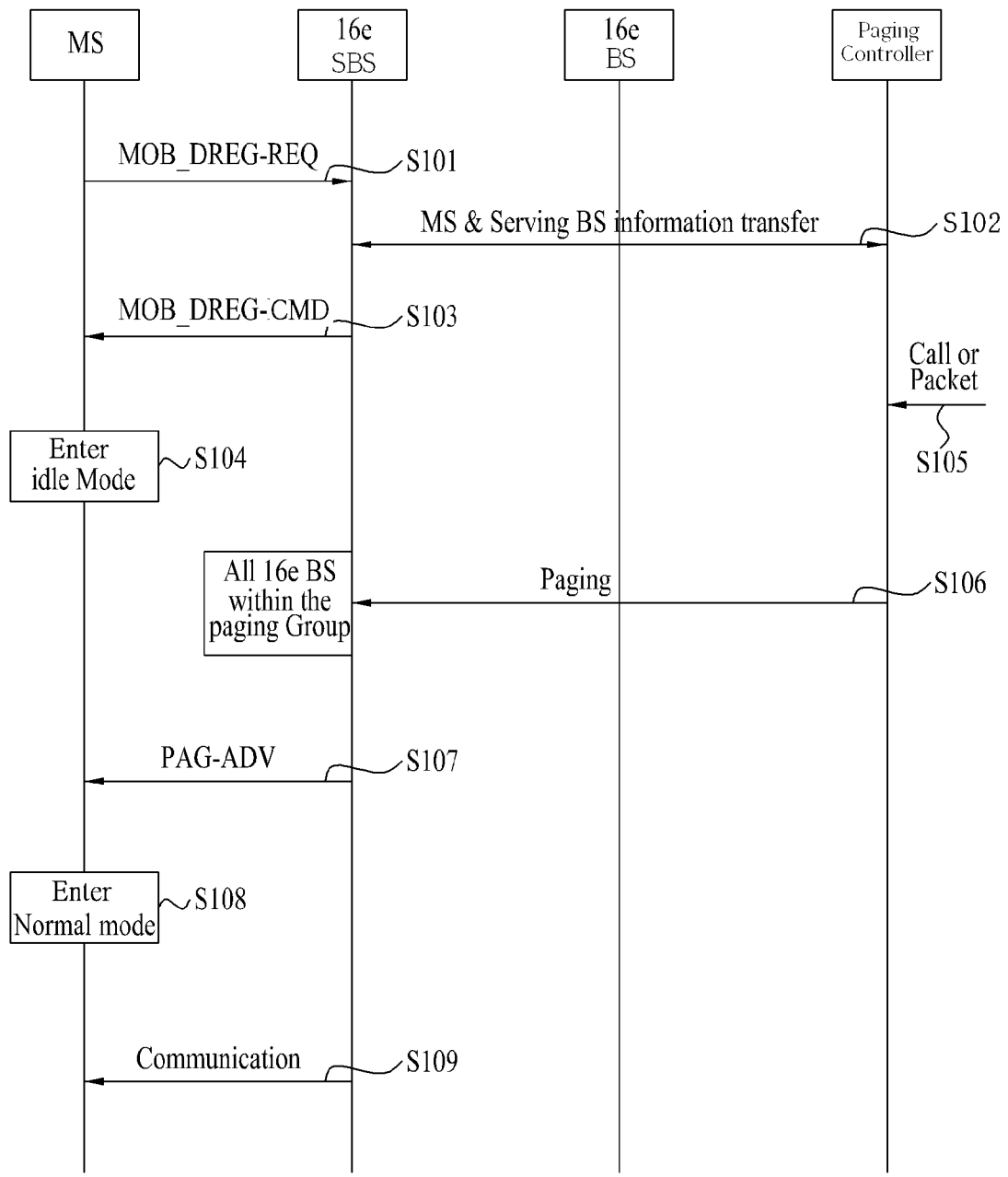
FIG. 1 is a diagram illustrating an example of a procedure of enabling a mobile station to enter an idle mode in a general IEEE 802.16 system.

The present invention relates to a wireless access system. Hereinafter, the embodiments of the present invention disclose a method for transmitting reliable SMS and an apparatus structure for performing the same.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

The embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. The terminology, 'base station (BS)' may be replaced with terminologies such as a fixed station, Node B, eNode B (eNB), an access point (AP), and an advanced BS (ABS). Also, the terminology, 'terminal' may be replaced with terminologies such as a user equipment (UE), a mobile station (MS), a mobile subscriber station (MSS), an advanced MS (AMS), and a subscriber station (SS).

The embodiments according to the present invention may be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the method according to the embodiments of the present invention may be implemented by a type of a module, a procedure, or a function, which performs functions or operations described as above. For example, a software code may be stored in a memory unit and then may be driven by a processor. The memory unit may be located inside or outside the processor to transmit and receive data to and from the processor through various means which are well known.

The embodiments of the present invention may be supported by standard documents disclosed in at least one of wireless access systems, i.e., IEEE 802 system, 3GPP system, 3GPP LTE system, and 3GPP2 system. Namely, among the embodiments of the present invention, steps or parts which are not described to clarify the technical features of the present invention may be supported by the above standard documents. Also, all terminologies disclosed herein may be described by the above standard documents. Particularly, the embodiments of the present invention may be supported by one or more of standard documents of IEEE 802.16 system, i.e., P802.16-2004, P802.16e-2005, P802.16Rev2, and IEEE P802.16m.

Specific terminologies hereinafter used in the embodiments of the present invention are provided to assist understanding of the present invention, and various modifications may be made in the specific terminologies within the range that they do not depart from technical spirits of the present invention.

First of all, a procedure of transmitting SMS isomg a ranging process which is a basic process of the embodiments of the present invention will be described with reference to FIG. 2 and FIG. 3.

Figure 2:
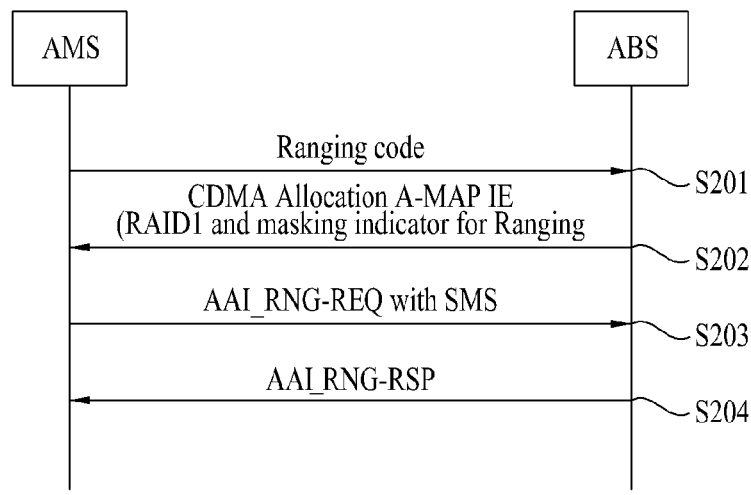
FIG. 2 is a diagram illustrating an example of transmission of SMS from a mobile station to a base station during a ranging process in an IEEE 802.16m system.

FIG. 2 is a diagram illustrating an example of transmission of SMS from a mobile station to a base station during a ranging process in an IEEE 802.16m system.

Referring to FIG. 2, the mobile station transmits a ranging code to the base station during a ranging process for location update in an idle mode (S201).

In more detail, the mobile station AMS acquires downlink synchronization with the base station, which is a target for ranging, to perform location update ranging, and receives an uplink transmission parameter. The mobile station selects a ranging slot (or ranging opportunity) in accordance with random backoff, randomly selects a handover ranging code and transmits the selected handover ranging code to the selected ranging slot.

The base station that has received the ranging code transmits a ranging acknowledgement (AAI_RNG-ACK) message to the mobile station (not shown). The ranging ACK message may include a ranging code transmitted from mobile station(s) for a predetermined frame, a receiving status of the ranging code, and a physical correction value based on the receiving status. In more detail, if the base station receives the ranging codes from the mobile station, it transmits allocation information of the AAI_RNG-ACK message to the mobile station through a broadcast assignment A-MAP IE based on a broadcast masking code in response to the ranging codes.

As a result that the mobile station receives the ranging ACK message and identifies a ranging ACK (RNG-ACK) bitmap of the corresponding message, if there is no ranging code successfully decoded in the selected ranging slot or if there is no response to ranging attempt of the corresponding mobile station in the ranging ACK message, the mobile station may determine that ranging has been failed. As a result, the mobile station restarts the location update procedure.

If ranging attempt is successfully performed, three responses may be provided by the base station to the mobile station through the AAI_RNG-ACK message, as follows. First of all, if the ranging status is 'continue', the physical correction value is included in the corresponding message. Next, if the ranging status is 'success', the base station allocates an uplink resource for transmitting a ranging request message to the mobile station. At this time, the physical correction value may further be included in the corresponding message. Finally, if the ranging status is 'abort', the base station may request the mobile station to abort the ranging process for a certain time period.

The mobile station continues to perform the ranging process by using the physical correction value included in the AAI_RNG-ACK message if the ranging status is 'continue', and proceeds to next step if the ranging status is 'success'.

If the ranging status is 'success', the base station allocates the uplink resource for transmitting the ranging request (AAI_RNG-REG) message to the mobile station. Allocation of the uplink resource may be performed through a CDMA allocation A-MAP IE. At this time, the corresponding map information element may be masked with RAID (S202).

The mobile station is allocated with the uplink resource from the base station and transmits the AAI_RNG-REQ message, which includes SMS information, to the base station through the uplink resource (S203). At this time, the SMS information may be included in the AAI_RNG-REQ message in a type of SMS field.

The base station transmits a ranging response (AAI_RNG-RSP) message to the mobile station in response to the AAI_RNG-REQ message transmitted from the mobile station (S204).

In the following embodiments including FIG. 2, it is assumed that the mobile station receives the AAI_RNG-ACK message set to the ranging status of 'success' in accordance with successful transmission of the ranging code or transmission of the AAI_RNG-ACK message is omitted in accordance with successful reception of all the ranging codes for a predetermined interval. In other words, the AAI_RNG-ACK message is not shown in the following drawings.

Figure 3:
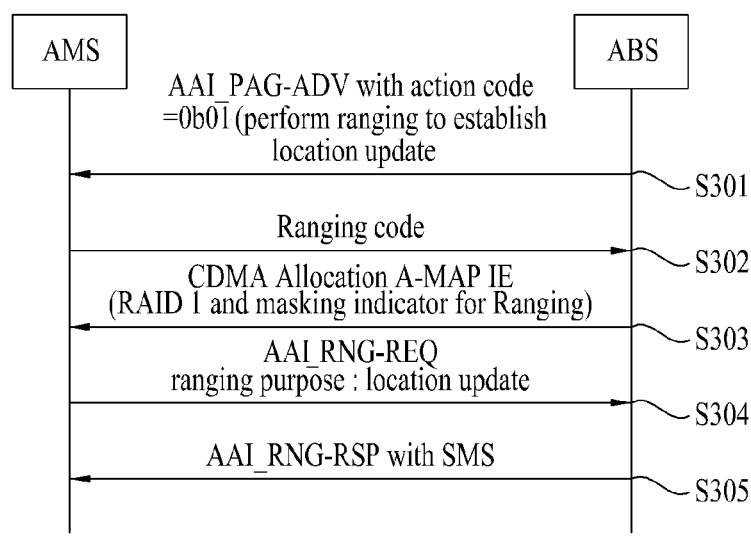
FIG. 3 is a diagram illustrating an example of transmission of SMS from a base station to a mobile station, which operates in an idle mode, during a ranging process in an IEEE 802.16m system.

FIG. 3 is a diagram illustrating an example of transmission of SMS from a base station to a mobile station, which operates in an idle mode, during a ranging process in an IEEE 802.16m system.

The base station may command the mobile station, which operates in an idle mode, to perform location update through a paging advertisement (AAI_PAG-ADV) message if there is SMS for transmission in the mobile station (S301).

As a result, the mobile station transmits a handover ranging code to the base station (S302).

The base station allocates an uplink resource for transmitting AAI_RNG-REQ message to the mobile station as it successfully receives the ranging code (S303).

The mobile station transmits AAI_RNG-REQ message to the base station through the allocated uplink resource (S304).

The base station transmits AAI_RNG-RSP message, which includes SMS information for transmission, to the mobile station in response to the AAI_RNG-REQ message (S305). At this time, the SMS information may be included in the AAI_RNG-RSP message in a type of SMS field.

However, a transmitter needs to identify whether a receiver has successfully received the SMS, during transmission of the SMS through the aforementioned ranging process. To this end, the present invention suggests that a message ACK (AAI_MSG-ACK) message should be used.

The message ACK message may be used by the base station and the mobile station to identify whether MAC management message has been received. In other words, if a message over management connection is accompanied with a MAC control extended header (MCEH) of which polling bit is set to 1, the receiver of the corresponding message responds using the message ACK message. In this case, if the mobile station, which operates in an idle mode, transmits a ranging request message for location update to the base station, the base station transmits a ranging response message to the mobile station in response to the ranging request message. At this time, if SMS is included in the ranging response message of the base station, the base station may set the polling bit '1' of the MCEH to the ranging response message to identify whether the ranging response message has been received. However, since the corresponding mobile station is not allocated with a station identifier (STID), a problem may occur in that it is not easy for the mobile station to directly request the base station of an uplink resource (bandwidth request) for transmission of the AAI_MSG-ACK message.

Accordingly, one embodiment of the present invention suggests that HARQ feedback information on the AAI_RNG-RSP message should be used to identify whether the ranging response message has been received.

In other words, in the method according to this embodiment of the present invention, the base station does not request the mobile station of the AAI_MSG-ACK message in response to the AAI_RNG-RSP message. Instead, the base station may identify whether the mobile station has received the corresponding message, through HARQ feedback (ACK/NACK) information on the AAI_RNG-RSP message. If HARQ ACK is not received from the mobile station to reach the maximum number of HARQ retransmission times for the AAI_RNG-RSP message, the base station determines that the mobile station has not received the corresponding AAI_RNG-RSP message successfully (that is, local NACK).

The aforementioned method will be described with reference to FIG. 4.

Figure 4:
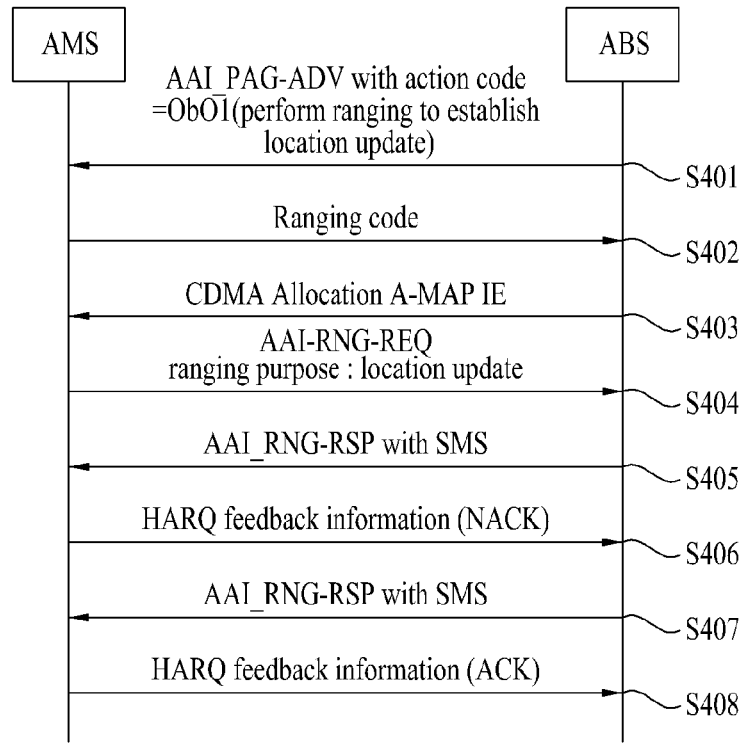
FIG. 4 is a diagram illustrating an example of a procedure of enabling a base station to transmit a ranging response message including SMS to a mobile station which is in an idle mode and acknowledge the ranging response message in accordance with one embodiment of the present invention.

FIG. 4 is a diagram illustrating an example of a procedure of enabling a base station to transmit a ranging response message including SMS to a mobile station which is in an idle mode and acknowledge the ranging response message in accordance with one embodiment of the present invention.

Referring to FIG. 4, if there is SMS to be transmitted to a mobile station which operates in an idle mode, the base station may command the mobile station to perform location update through a paging advertisement (AAI_PAG-ADV) message for a paging interval (S401).

As a result, the mobile station transmits a handover ranging code to the base station (S402).

The base station allocates an uplink resource for transmitting AAI_RNG-REQ message to the mobile station as it successfully receives the ranging code (S403).

The mobile station transmits AAI_RNG-REQ message for location update to the base station through the allocated uplink resource (S404).

The base station transmits AAI_RNG-RSP message, which includes SMS information for transmission, to the mobile station in response to the AAI_RNG-REQ message (S405).

If the mobile station fails to receive the AAI_RNG-RSP message, it transmits HARQ NACK to the base station (S406), whereby the base station retransmits the AAI_RNG-RSP message to the base station (S407).

If the mobile station successfully receives the retransmitted AAI_RNG-RSP message, it transmits HARQ ACK to the base station, whereby the SMS transmission procedure ends (S408).

In the meantime, another embodiment of the present invention suggests that AAI_MSG-ACK message should be used to identify a reception status of the AAI_RNG-RSP message but uplink resource allocation information should be included in the AAI_RNG-RSP message to transmit the AAI_MSG-ACK message.

In other words, if the base station requests the mobile station of the AAI_MSG-ACK message in response to the AAI_RNG-RSP message (polling bit set to 1 in MCEH), it includes uplink allocation information in the AAI_RNG-RSP message to transmit the AAI_MSG-ACK, as follows.

Uplink (UL) assignment indicator: indicates whether UL assignment information is included in the corresponding message.

Resource index: indicates a start point of uplink resources (LRU index) for transmitting the corresponding message (AAI_MSG-ACK) and the number of allocated resources (the number of LRUs).

Long TTI Indicator: indicates the number of subframes (AAI subframes) spanned by the allocated resource.

IsizeOffset: indicates an index for calculating burst size index. The mobile station may identify a modulation and coding scheme through this index value. Otherwise, the mobile station may directly indicate burst size instead of ISizeOffset.

HFA: indicates a region for transmitting HARQ feedback (ACK/NACK) information during HARQ application.

ACID: indicates HARQ channel indicator for identifying HARQ channel.

The SMS transmission procedure corresponding to the case where the aforementioned fields are included in the AAI_RNG-RSP message will be described with reference to FIG. 5.

Figure 5:
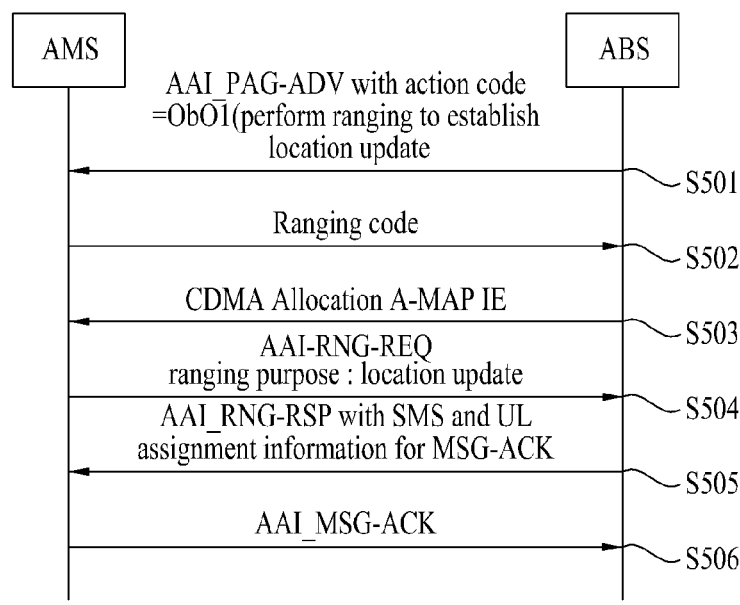
FIG. 5 is a diagram illustrating an example of a procedure of enabling a base station to transmit a ranging response message including SMS to a mobile station which is in an idle mode and acknowledge the ranging response message in accordance with another embodiment of the present invention.

FIG. 5 is a diagram illustrating an example of a procedure of enabling a base station to transmit a ranging response message including SMS to a mobile station which is in an idle mode and acknowledge the ranging response message in accordance with another embodiment of the present invention.

Referring to FIG. 5, if there is SMS to be transmitted to a mobile station which operates in an idle mode, the base station may command the mobile station to perform location update through a paging advertisement (AAI_PAG-ADV) message for a paging interval of the corresponding mobile station (S501).

As a result, the mobile station transmits a handover ranging code to the base station (S502).

The base station allocates an uplink resource for transmitting AAI_RNG-REQ message to the mobile station as it successfully receives the ranging code (S503).

The mobile station transmits AAI_RNG-REQ message for location update to the base station through the allocated uplink resource (S504).

The base station transmits AAI_RNG-RSP message, which includes SMS information for transmission and uplink resource allocation information for transmitting the AAI_MSG-ACK message from the mobile station, to the mobile station in response to the AAI_RNG-REQ message (S505). At this time, the AAI_RNG-RSP message is accompanied with the MCEH of which polling bit is set to 1.

The mobile station transmits AAI_MSG-ACK message, which includes information as to whether the AAI_RNG-RSP message has been successfully received, to the base station through the allocated uplink resource (S506).

The aforementioned method according to this embodiment is efficient in that the mobile station, which operates in an idle mode, does not need to request the base station of an uplink resource for transmitting the AAI_MSG-ACK message without a separate process (for example, network reentry).

In the meantime, still another embodiment of the present invention suggests that AAI_MSG-ACK message should be used to identify a reception status of the AAI_RNG-RSP message by referring to uplink resource allocation information for transmission of the AAI_RNG-REQ message.

In other words, if the base station requests the mobile station of the AAI_MSG-ACK message in response to the AAI_RNG-RSP message (polling bit set to 1 in MCEH), it allocates a resource for AAI_MSG-ACK message transmission on the basis of uplink resource allocation information on the AAI_RNG-REQ message, and the mobile station determines a resource for the AAI_MSG-ACK message in the same manner as the base station. Hereinafter, a method for referring to a resource for the AAI_RNG-REQ message to determine a resource for transmission of the AAI_MSG-ACK message will be listed.

Information on frame to which an uplink resource for AAI_MSG-ACK message transmission is allocated:

may explicitly be transmitted through the AAI_RNG-RSP message, or may be defined by the nth frame (n 0) after the AAI_RNG-RSP message is transmitted/received. At this time, n is previously defined or explicitly transferred through the AAI_RNG-RSP message. Also, the value 'n' should previously be defined considering the maximum number of HARQ retransmission times and HARQ retransmission timing of the AAI_RNG-RSP message, or should be allocated through the AAI_RNG-RSP message whenever retransmission is performed.

subframe to which AAI_MSG-ACK message is transmitted and carrier location information:

the base station allocates a resource to the same subframe index, to which the AAI_RNG-REQ message is transmitted, starting from the same start point (LRU index). In other words, if the resource for AAI_MSG-ACK message transmission is compared with the resource for AAI_RNG-REQ message transmission, the frame is the one indicated by the aforementioned frame information, and within the corresponding frame, a resource region for the AAI_MSG-ACK message starts from the point corresponding to a start point of a resource within the subframe to which AAI_RNG-REQ message is transmitted.

Long TTI and HFA index/ACID information:

the same Long TTI and HFA index/ACID as those of the AAI_RNG-REQ message are used.

MCS information:

the number of LRUs is defined for application of the MCS of a value which is the same as or the closest to and not greater than the AAI_RNG-REQ message.

The mobile station may determine the uplink resource for AAI_MSG-ACK transmission by referring to the resource for transmitting the AAI_RNG-REQ message in accordance with the aforementioned rule.

The aforementioned method will be described by a frame block with reference to FIG. 6.

Figure 6:
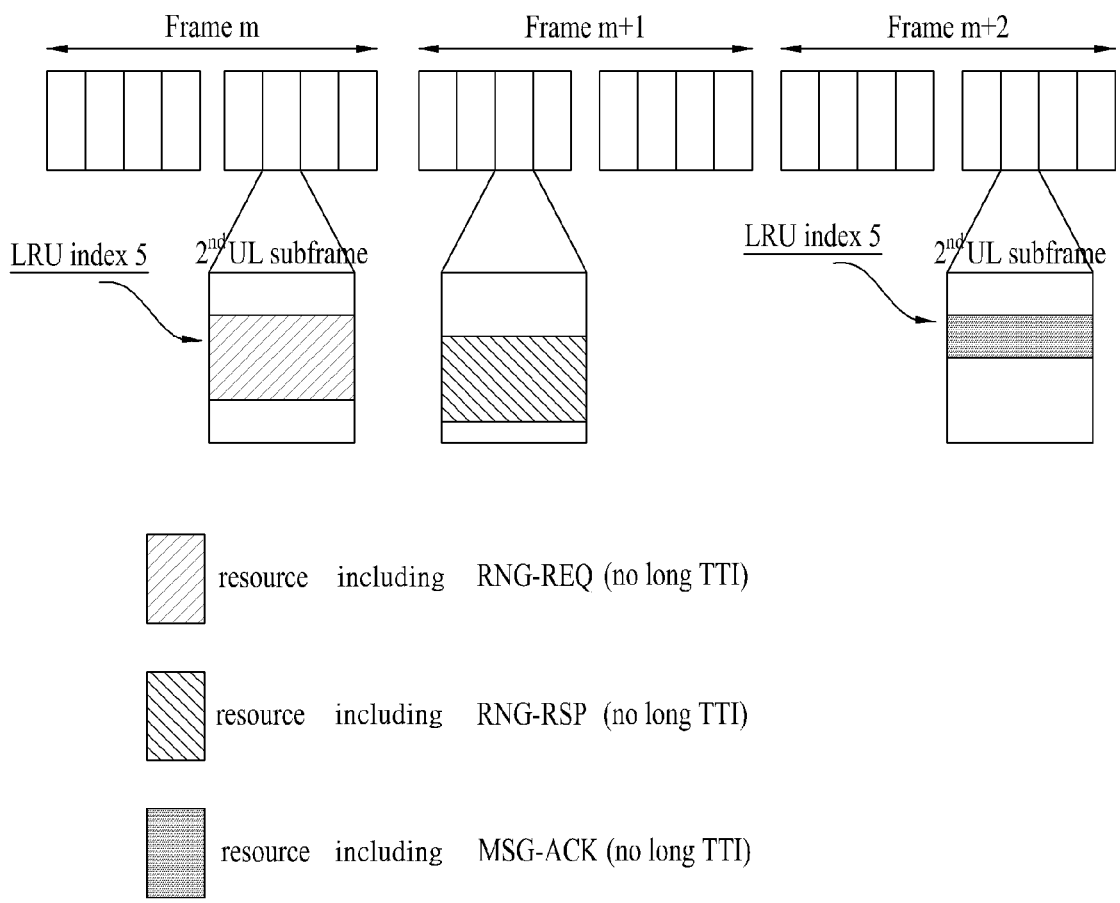
FIG. 6 is a diagram illustrating an example of determining a resource for message ACK response message transmission by referring to a resource for ranging request message transmission in accordance with still another embodiment of the present invention.

FIG. 6 is a diagram illustrating an example of determining a resource for a message ACK response message transmission by referring to a resource for ranging request message transmission in accordance with still another embodiment of the present invention.

In FIG. 6, it is assumed that a ratio between uplink subframes and downlink subframes is 4:4 and 'n' has a value of 1 (that is, the AAI_MSG-ACK message is transmitted for next frame to which the AAI_RNG-RSP message is transmitted). Referring to FIG. 6, if the AAI_RNG-REQ message is transmitted through a resource that starts from LRU index no. 5 of the second uplink subframe of the mth frame, the AAI_RNG-RSP message is transmitted from the base station to the mobile station for the m+1th frame. At this time, if the AAI_RNG-RSP message is accompanied with the MCEH of which polling bit is set to 1, the mobile station transmits the AAI_MSG-ACK message to the base station by referring to a resource index of the subframe to which the AAI_RNG-REQ message is transmitted, for the m+2th frame. In other words, the mobile station transmits the AAI_MSG-ACK message through the resource that starts from LRU index no. 5 of the second uplink subframe for the m+2th frame. At this time, the start points of the uplink resources are LRU index no. 5 and are the same as one another but their end points may be different from one another due to the difference in size of the AAI_RNG-REQ message and the AAI_MSG-ACK message.

Hereinafter, in addition to determining frames, subframes and start points (that is, LRU index) by referring to the uplink resource allocated for the AAI_RNG-REQ message, a method for defining a size (that is, the number of LRUs) of a resource, which will be allocated for transmission of the AAI_MSG-ACK message, will be described with reference to Table 1 and Table 2.

Table 1 illustrates a coding rate based on Isizeoffset and the number of resource units, and Table 2 illustrates a burst size based on Isizeoffset and the number of resource units. In Table 1 and Table 2, it is assumed that one logical resource unit (LRU) has a size of 18 subcarriers×6 OFDMA symbols.

TABLE 1

| $I_{\_offset}$#RU | 0 | 1 | 2 | 3 | 4 |
|---|---|---|---|---|---|
| 1 | 0.25 | 0.333 | 0.375 | 0.417 | 0.458 |
| 2 | 0.125 | 0.167 | 0.188 | 0.208 | 0.229 |
| 3 | 0.083 | 0.111 | 0.125 | 0.139 | 0.153 |
| 4 | 0.083 | 0.094 | 0.104 | 0.115 | 0.125 |
| 5 | 0.083 | 0.092 | 0.1 | 0.108 | 0.125 |
| 6 | 0.083 | 0.09 | 0.104 | 0.118 | 0.132 |
| 7 | 0.089 | 0.101 | 0.113 | 0.131 | 0.149 |

TABLE 2

| $I_{\_offset}$#RU | 0 | 1 | 2 | 3 | 4 |
|---|---|---|---|---|---|
| 1 | 6 | 8 | 9 | 10 | 11 |
| 2 | 6 | 8 | 9 | 10 | 11 |
| 3 | 6 | 8 | 9 | 10 | 11 |
| 4 | 8 | 9 | 10 | 11 | 12 |
| 5 | 10 | 11 | 12 | 13 | 15 |
| 6 | 12 | 13 | 15 | 17 | 19 |
| 7 | 15 | 17 | 19 | 22 | 25 |

For example, if the number of LRUs allocated to the AAI_RNG-REQ message is 7 and Isizeoffset is 3, a coding rate is 0.131 in Table 1. If a total length of AAI_MSG-ACK is 10 bytes, coding rates of Table 1, which correspond to 10 of Table 2 and may be applied to the corresponding message, are 0.083, 0.104, 0.139, 0.208 and 0.417. Among the coding rates, the value which is not greater than and the closest to 0.131 is 0.104. Accordingly, the base station allocates four LRUs.

In the meantime, further still another embodiment of the present invention suggests that the AAI_MSG-ACK message should be used to identify a reception status of the AAI_RNG-RSP message but uplink resource allocation information should be transmitted from the mobile station by referring to a downlink (DL) resource to which the AAI_RNG-RSP message is transmitted.

In more detail, if the base station requests the mobile station of the AAI_MSG-ACK message in response to the AAI_RNG-RSP message (polling bit set to 1 in MCEH), it allocates a resource for AAI_MSG-ACK message transmission on the basis of downlink allocation information on the AAI_RNG-RSP message. Hereinafter, a method for referring to a resource for AAI_RNG-REQ message to determine a resource for AAI_MSG-ACK message transmission will be listed.

Information on frame to which AAI_MSG-ACK message is transmitted:

may explicitly be transferred through the AAI_RNG-RSP message, or may be defined by the nth frame (n≥0) after the AAI_RNG-RSP message is transmitted/received. At this time, a value 'n' is previously defined or explicitly transferred through the AAI_RNG-RSP message. Also, it is preferable that the corresponding frame information should be defined considering the maximum number of HARQ retransmission times and HARQ retransmission timing of the AAI_RNG-RSP message, or should be allocated whenever retransmission is performed.

subframe index:
may be determined by an uplink (UL) subframe related to a downlink (DL) subframe to which the AAI_RNG-RSP message is transmitted. In more detail, the subframe index may be defined by the same subframes in case of frequency division duplex (FDD) mode, and may be defined by a previously defined rule based on a downlink to uplink subframe ratio (DL/UL ratio).

Logical resource unit (LRU) index, Long TTI and HFA index:
may be used as the same value as index to which the AAI_RNG-RSP message is transmitted.

MCS:
the number of LRUs may be defined for application of the MCS of a value which is the same as or the closest to and not greater than the AAI_RNG-RSP message.

Hereinafter, an example of a type of determining subframe index and LRU index in accordance with this embodiment will be described with reference to FIG. 7 and FIG. 8.

First of all, a method for determining subframe index will be described with reference to FIG. 7.

Figure 7:
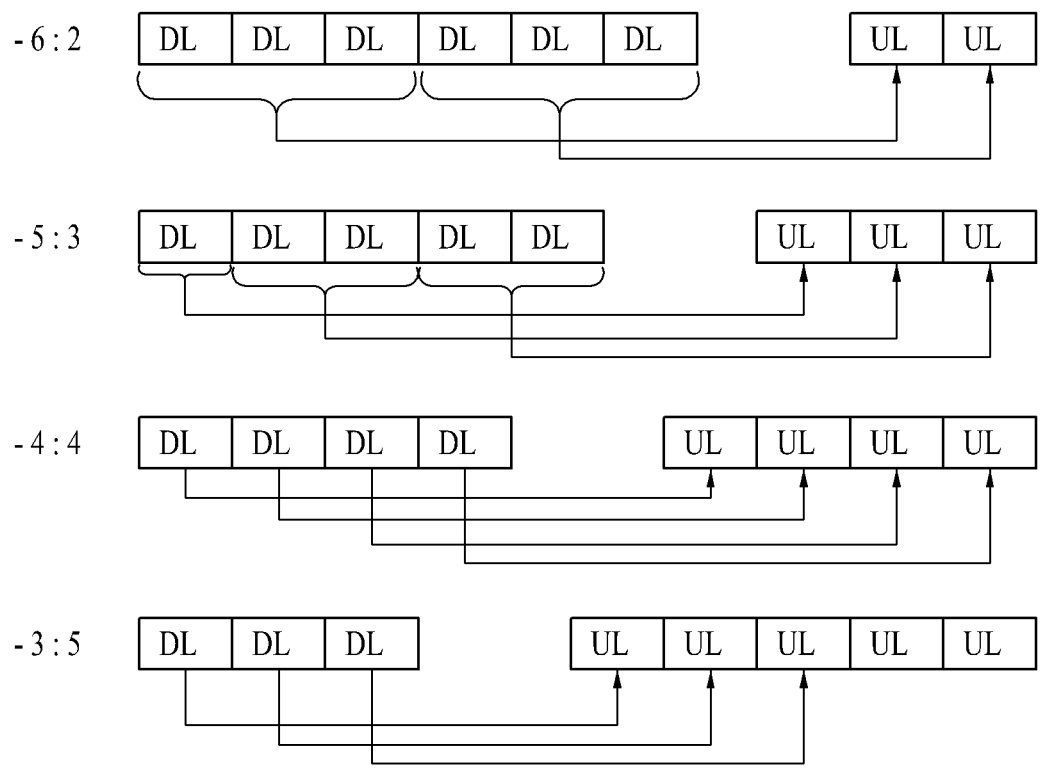
FIG. 7 is a diagram illustrating an example of a correspondence relation of an uplink frame and a downlink frame when a subframe index of a resource for message ACK response message transmission is determined by referring to a resource for ranging response message transmission in accordance with further still another embodiment of the present invention.

FIG. 7 is a diagram illustrating an example of a correspondence relation of an uplink frame and a downlink frame when a subframe index of a resource for message ACK response message transmission is determined by referring to a resource for ranging response message transmission in accordance with further still another embodiment of the present invention.

In FIG. 7, it is assumed that a frame structure is a TDD structure. First of all, if a DL:UL subframe ratio is 6:2 and the AAI_RNG-RSP message is transmitted through the first to third downlink subframes, the uplink subframe for the AAI_MSG-ACK message may be determined as the first one, and if the AAI_RNG-RSP message is transmitted through the fourth to sixth downlink subframes, the uplink subframe for the AAI_MSG-ACK message may be determined as the second one. Also, if the DL:UL ratio is 5:3, 1:2:2 correspondence relation may be obtained. If the DL:UL ratio is 4:4, 1:1 correspondence relation may be obtained. If UL subframes are more than DL subframes, correspondence relation may be obtained as shown in the lowest part of FIG. 7.

In FIG. 7, the correspondence relation of UL subframes to DL subframes are exemplary, and it will be apparent that more correspondence relations may be set.

Next, a method for determining LRU index will be described with reference to FIG. 8.

Figure 8:
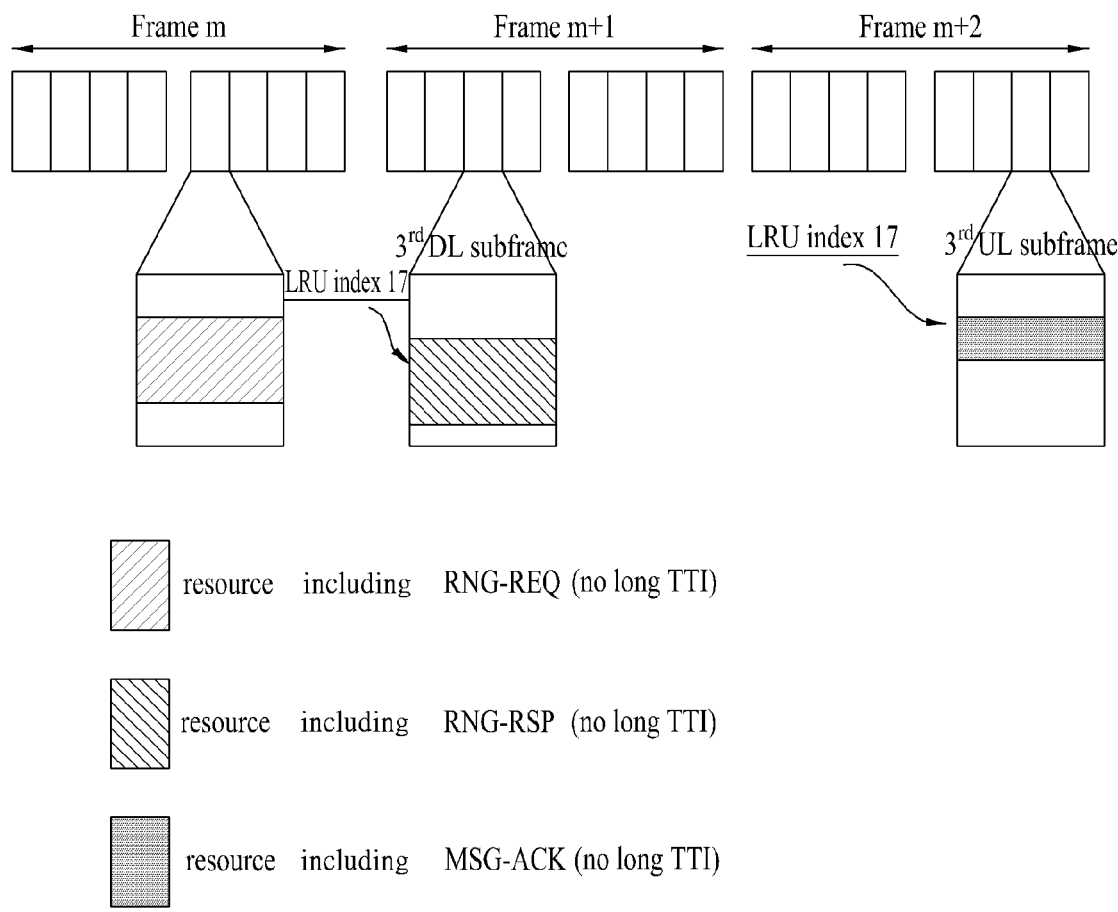
FIG. 8 is a diagram illustrating an example of a method of determining a logical resource unit index of a resource for message ACK response message transmission by referring to a resource for ranging response message transmission in accordance with further still another embodiment of the present invention.

FIG. 8 is a diagram illustrating an example of a method of determining a logical resource unit index of a resource for message ACK response message transmission by referring to a resource for ranging response message transmission in accordance with further still another embodiment of the present invention.

In FIG. 8, it is assumed that a ratio between uplink subframes and downlink subframes is 4:4 and 'n' has a value of 1 (that is, the AAI_MSG-ACK message is transmitted for next frame to which the AAI_RNG-RSP message is transmitted). Referring to FIG. 8, if the AAI_RNG-REQ message is transmitted for the mth frame, the AAI_RNG-RSP message is transmitted from the base station to the mobile station through a resource that starts from LRU index no. 17 of the third downlink subframe of the m+1th frame. At this time, if the AAI_RNG-RSP message is accompanied with the MCEH of which polling bit is set to 1, the mobile station transmits the AAI_MSG-ACK message to the base station by referring to a resource index of the subframe to which the AAI_RNG-RSP message is transmitted, for the m+2th frame. In other words, the mobile station transmits the AAI_MSG-ACK message through the resource that starts from LRU index no. 17 of the third uplink subframe for the m+2th frame. At this time, the start points of the uplink resources are LRU index no. 17 and are the same as one another but their end points may be different from one another due to the difference in size of the AAI_RNG-RSP message and the AAI_MSG-ACK message.

Hereinafter, when SMS is transferred from the mobile station to the base station through the AAI_RNG-REQ message, a procedure of a case where the mobile station fails to receive a response as to whether the base station has received the SMS will be described with reference to FIG. 9.

Figure 9:
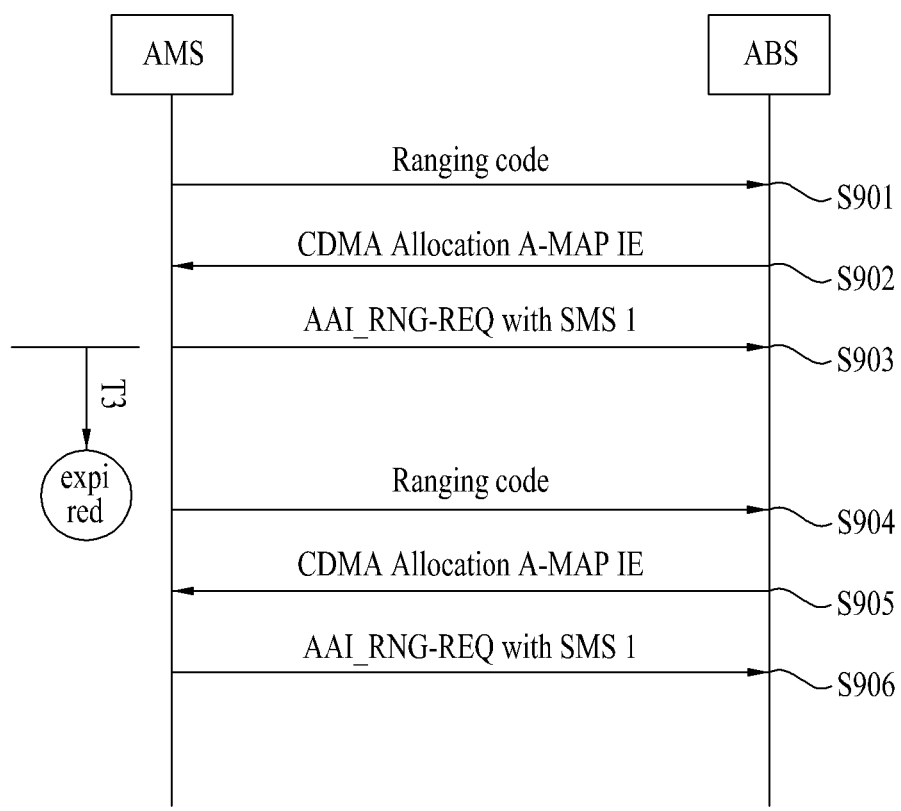
FIG. 9 is a diagram illustrating an example of an action procedure when a mobile station fails to acknowledge whether a base station has received SMS during a SMS transmission procedure according to the present invention.

FIG. 9 is a diagram illustrating an example of an action procedure when a mobile station does not acknowledge whether a base station has received SMS during a SMS transmission procedure through ranging according to the present invention.

Referring to FIG. 9, if there is SMS for transmission, the mobile station which operates in an idle mode transmits a ranging code to the base station through a location update procedure so as to transmit the SMS (S901).

The base station that has successfully received the ranging code transmitted from the mobile station allocates an uplink resource for AAI-RNG-REQ message transmission of the mobile station (S902).

The mobile station transmits AAI_RNG-REQ message, which includes SMS, to the base station through the allocated uplink resource. At this time, the mobile station starts a T3 timer (S903).

In this case, the T3 timer means the standby time for receiving the AAI_RNG-RSP message in response to the AAI_RNG-REQ message transmitted from the mobile station. If the mobile station fails to receive the AAI_RNG-RSP message until the T3 timer expires, the mobile station may perform a procedure of retransmitting AAI_RNG-REQ message like a general ranging procedure. In other words, the mobile station may retransmit the AAI_RNG-REQ message, which includes SMS, through the corresponding uplink resource (S906) by retransmitting the ranging code to the base station (S904) and being allocated with an uplink resource for transmitting the AAI_RNG-REQ message (S905).

Next, when SMS is transferred from the mobile station to the base station through the AAI_RNG-RSP message, a procedure of a case where the mobile station fails to receive a response as to whether the base station has received the SMS will be described.

In this procedure, a procedure of waiting for the AAI_RNG-RSP message in response to the AAI_RNG-REQ message transmitted from the mobile station may be performed using the T3 timer in the same manner as the related art. After receiving the AAI_RNG-RSP message, which includes SMS, the mobile station performs a procedure of responding to the aforementioned method for acknowledging the reception. In other words, the mobile station transmits HARQ feedback or AAI_MSG-ACK message to the base station in accordance with the received result of the AAI_RNG-RSP message.

If the base station fails to receive HARQ ACK until the maximum number of retransmission times in case of HARQ feedback, or if the AAI_MSG-ACK message is not received through a region allocated from the base station in case of AAI_MSG-ACK message, the base station determines that the mobile station has not received the AAI_RNG-RSP message normally.

The base station notifies the paging controller that the SMS has not been received normally. At this time, the paging controller may notify the base stations to which the paging controller belongs, of the fact that the SMS has not been received normally. As a result, the paging controller may request at least one of the base stations to which the paging controller belongs, to retransmit the SMS, whereby the mobile station may receive the corresponding SMS normally. At this time, the base station that retransmits the SMS may be the one that has first transmitted the SMS, or not. This is because that the mobile station may be moving.

The aforementioned procedure will be described with reference to FIG. 10 to FIG. 12.

Figure 10:
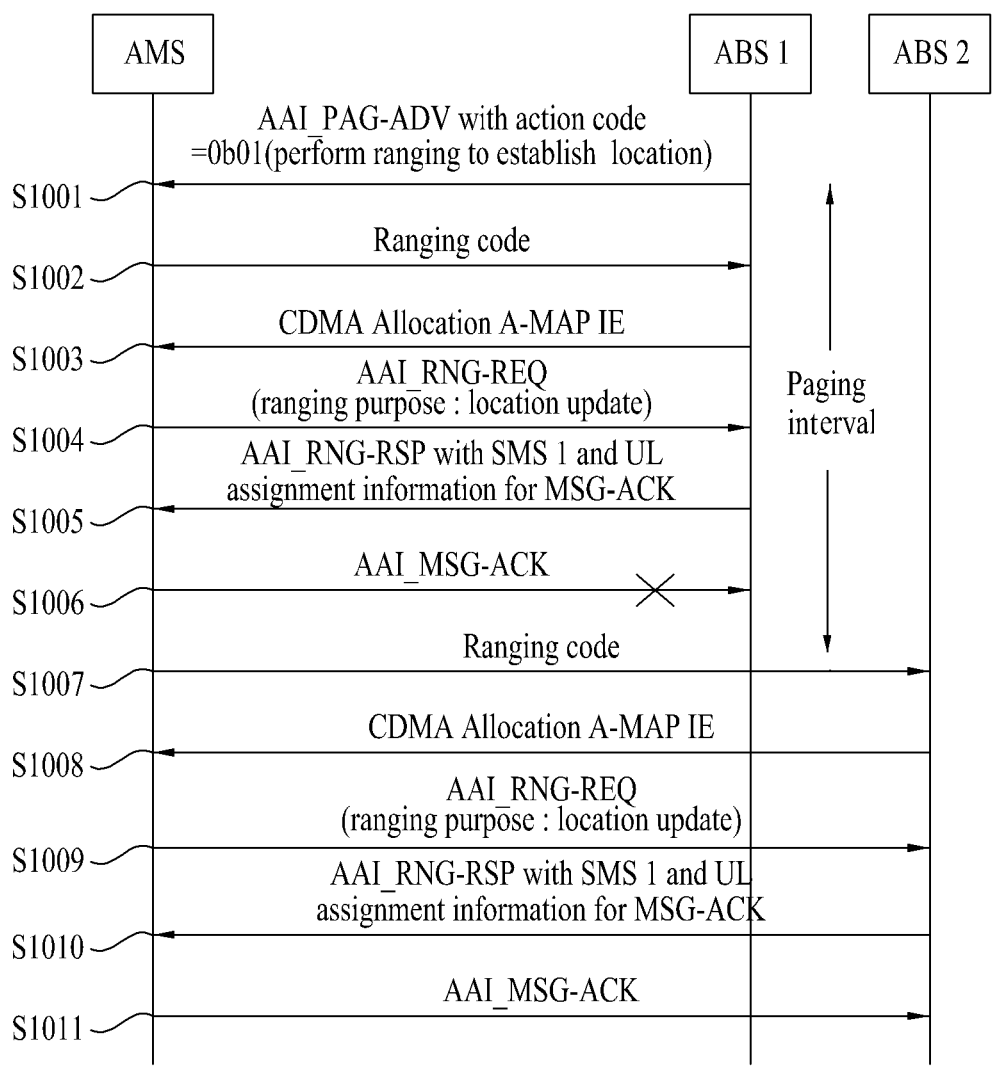
FIG. 10 is a diagram illustrating an example of a case where initial transmission is failed in a method for transmitting SMS in accordance with another embodiment of the present invention.

FIG. 10 is a diagram illustrating an example of a case where initial transmission is failed in a method for transmitting SMS in accordance with another embodiment of the present invention.

Referring to FIG. 10, if there is SMS for transmission to a mobile station which operates in an idle mode, the base station may command the mobile station to perform location update through a paging advertisement (AAI_PAG-ADV) message for a paging interval of the corresponding mobile station (S1001).

As a result, the mobile station transmits a handover ranging code to the base station 1 (S1002).

The base station 1 allocates an uplink resource for transmitting the AAI_RNG-REQ message to the mobile station as it successfully receives the ranging code (S1003).

The mobile station transmits the AAI_RNG-REQ message for location update to the base station 1 through the allocated uplink resource (S1004).

The base station 1 transmits AAI_RNG-RSP message, which includes SMS information for transmission and uplink resource allocation information for transmitting the AAI_MSG-ACK message from the mobile station, to the mobile station in response to the AAI_RNG-REQ message (S1005). At this time, the AAI_RNG-RSP message is accompanied with the MCEH of which polling bit is set to 1.

The mobile station transmits the AAI_MSG-ACK message, which includes information as to whether the AAI_RNG-RSP message has been successfully received, to the base station 1 through the allocated uplink resource, but the base station 1 fails to successfully receive the AAI_MSG-ACK message (S1006).

As a result, the base station 1 determines that the SMS transmission has been failed, and may notify the paging controller of the failure of the SMS transmission. Afterwards, if the base station 2 receives the AAI_RNG-REQ message based on location update of the corresponding mobile station before next interval, it retransmits the corresponding SMS through the AAI_RNG-RSP in response to the AAI_RNG-REQ (S1007-S1010).

At this time, the AAI_RNG-RSP message includes uplink resource allocation information for transmitting the AAI_MSG-ACK message from the mobile station. The mobile station transmits the AAI_MSK-ACK message to the base station 2 through the uplink resource allocation information, and the SMS transmission procedure ends as the base station 2 successfully receives the AAI_MSG-ACK message (S1011).

Figure 11:
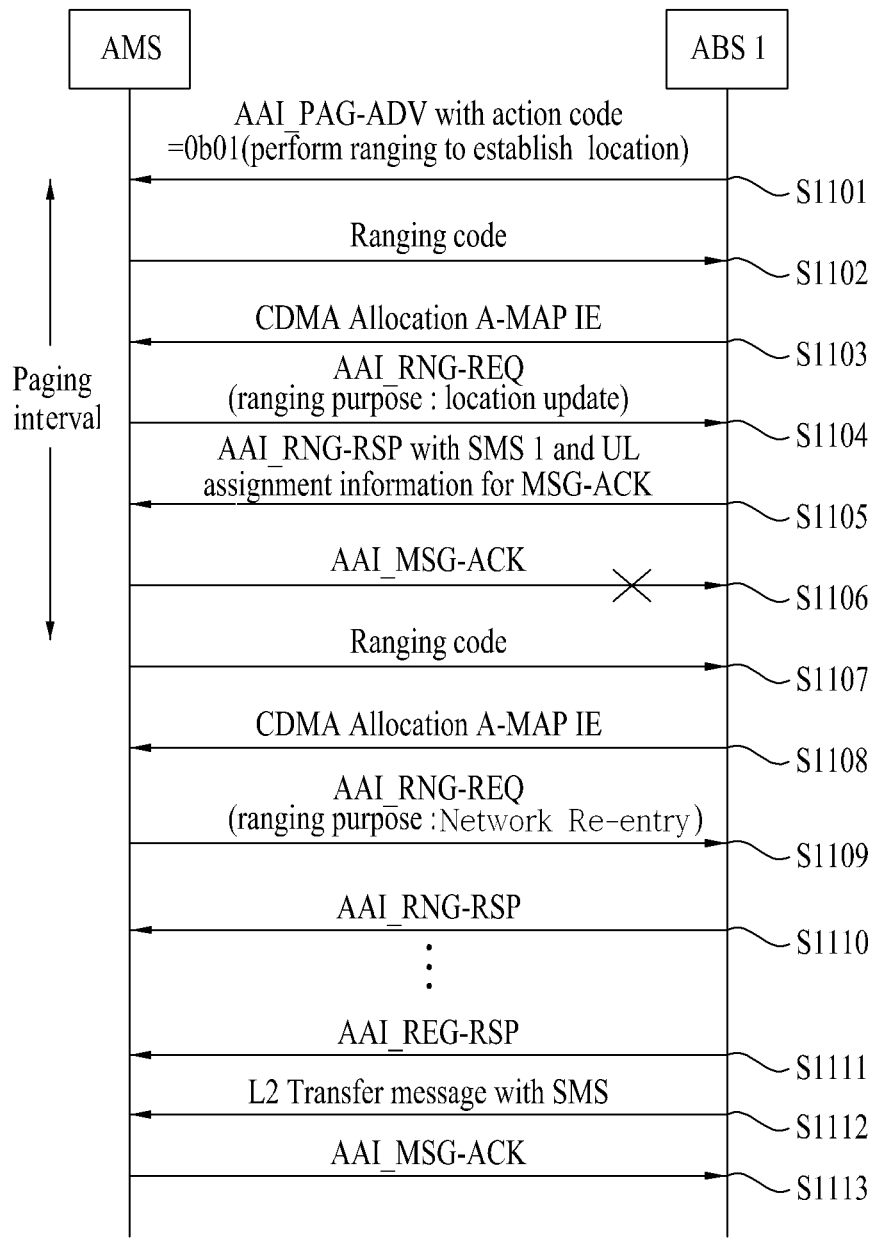
FIG. 11 is a diagram illustrating another example of a case where initial transmission is failed in a method for transmitting SMS in accordance with another embodiment of the present invention.

FIG. 11 is a diagram illustrating another example of a case where initial transmission is failed in a method for transmitting SMS in accordance with another embodiment of the present invention.

In FIG. 11, since step S1101 to step S1106 are similar to the step S1001 to the step S1006 of FIG. 10, the repeated description will be omitted for conciseness of the specification.

The mobile station fails to transmit the AAI_MSG-ACK at the step S1106, and may attempt network reentry from the idle mode through the ranging process before next paging interval.

In other words, the mobile station transmits the ranging code to the base station (S1107), and if the mobile station receives uplink resource allocation information for transmitting the AAI_RNG-REQ message from the base station (S1108), it transmits the AAI_RNG-REQ message, which includes a ranging target indicator field set to a value indicating network reentry, to the base station through the allocated resource (S1109).

Afterwards, the mobile station and the base station receive a registration response message by performing a network reentry procedure, whereby the mobile station may be allocated with STID and may complete the network reentry procedure (S1110 to S1111).

As a result, the base station may retransmit SMS determined that transmission has been failed, to the mobile station through a layer 2 transmission (AAI_L2-XFER) message (S1112).

At this time, the AAI_L2-XFER message may be accompanied with the MCEH of which polling bit is set to 1.

The mobile station transmits the AAI_MSG-ACK message, which includes information as to whether the AAI_L2-XFER message has been successfully received, to the base station, whereby the SMS transmission procedure is completed (S1113).

Figure 12:
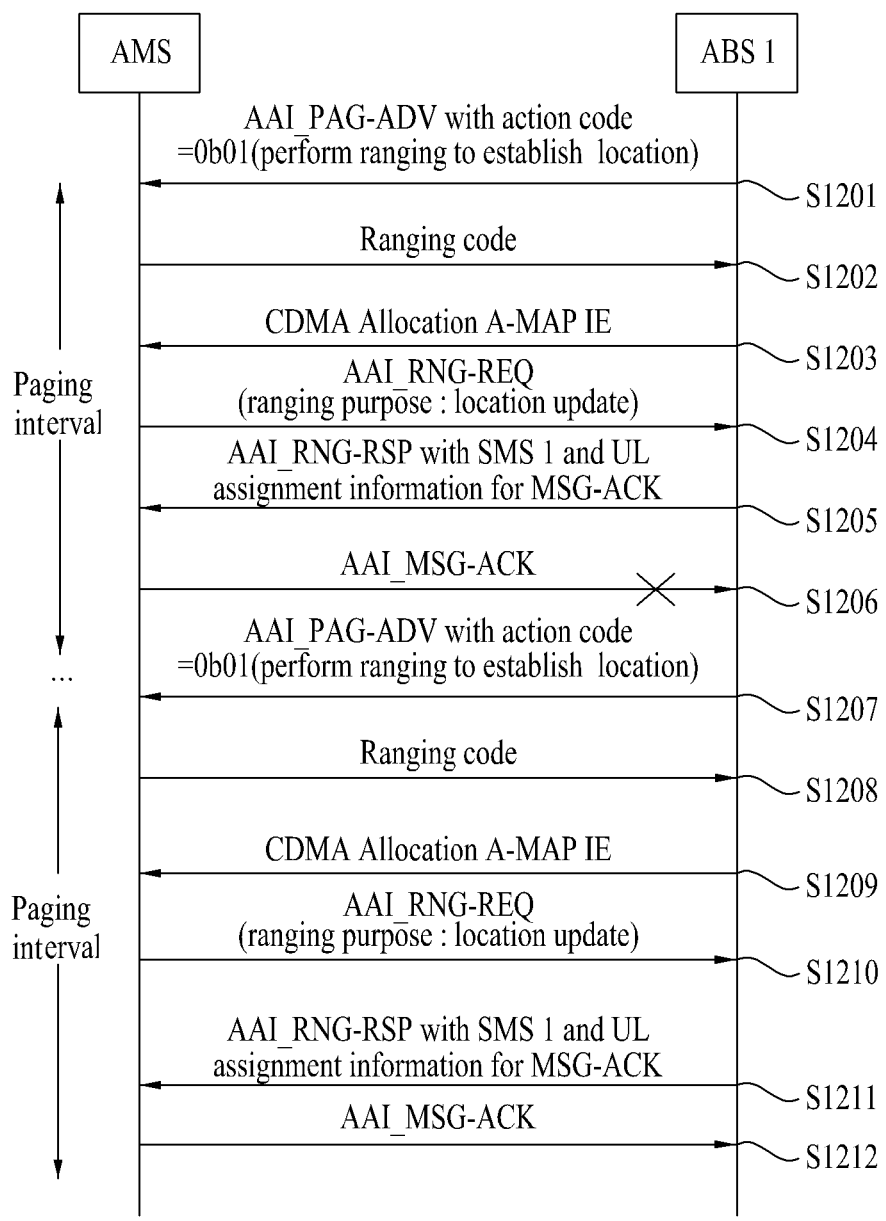
FIG. 12 is a diagram illustrating other example of a case where initial transmission is failed in a method for transmitting SMS in accordance with another embodiment of the present invention.

FIG. 12 is a diagram illustrating other example of a case where initial transmission is failed in a method for transmitting SMS in accordance with another embodiment of the present invention.

In FIG. 12, since step S1201 to step S1206 are similar to the step S1001 to the step S1006 of FIG. 10, the repeated description will be omitted for conciseness of the specification.

As the base station fails to receive the AAI_MSG-ACK message at the step S1206, it commands the mobile station to perform location update through the paging advertisement message for next paging interval (S1207). As a result, the mobile station and the base station again perform the location update procedure, and the mobile station transmits the AAI_RNG-RSP message, which includes corresponding SMS and uplink resource allocation information for the AAI_MSG-ACK message, to the base station during the location update procedure (S1208 to S1211).

The mobile station transmits the AAI_MSG-ACK message to the base station by using the uplink resource allocated through the AAI_RNG-RSP message, and the base station successfully receives the AAI_MSG-ACK message, whereby the SMS transmission procedure is completed (S1212).

Hereinafter, a method for allowing a receiver to determine whether SMS that may be applied to the aforementioned embodiments is the same as another one will be described. This is to solve a problem that may occur when the receiver has normally received SMS but the transmitter has failed to receive a response (for example, AAI_RNG-RSP in case of SMS transmitted from the mobile station, and AAI_MSG-ACK message in case of SMS transmitted from the base station) indicating successful reception of the receiver during the aforementioned procedure based on initial SMS transmission failure. In other words, although the receiver has normally received SMS, the transmitter has determined that SMS transmission has been failed, the transmitter will retransmit the SMS. In this case, the receiver needs to determine whether the retransmitted SMS is the same as the previously received SMS.

Accordingly, the present invention suggests that the transmitter should additionally transmit index (hereinafter, referred to as 'SMS index') for identifying the SMS when it transmits the SMS.

For example, if the SMS index is defined to have a 3 bit size, it is increased as much as 1 whenever new SMS is transmitted to the corresponding mobile station. In other words, the SMS index may be expressed by [index=(index+1) modulo 8]. The SMS index may start from 0 in case of the mobile station authenticated through initial network entry. Also, the SMS may be reset to 0 whenever STID is allocated or whenever the mobile station is shifted to an active state or another mode (for example, idle/sleep/content retention deregistration (DCR). At this time, it is preferable that the SMS index for the corresponding mobile station is shared by all the base stations of a paging group to which the corresponding mobile station belongs.

If the receiver receives the SMS having the same SMS index value as the previously received SMS index, it determines that the corresponding SMS has been repeatedly transmitted, and disregards (or deletes) the SMS.

Application example of the method for allowing a receiver to determine whether SMS is the same as another one, through the aforementioned SMS index, to FIG. 12 will be described with reference to FIG. 13.

Figure 13:
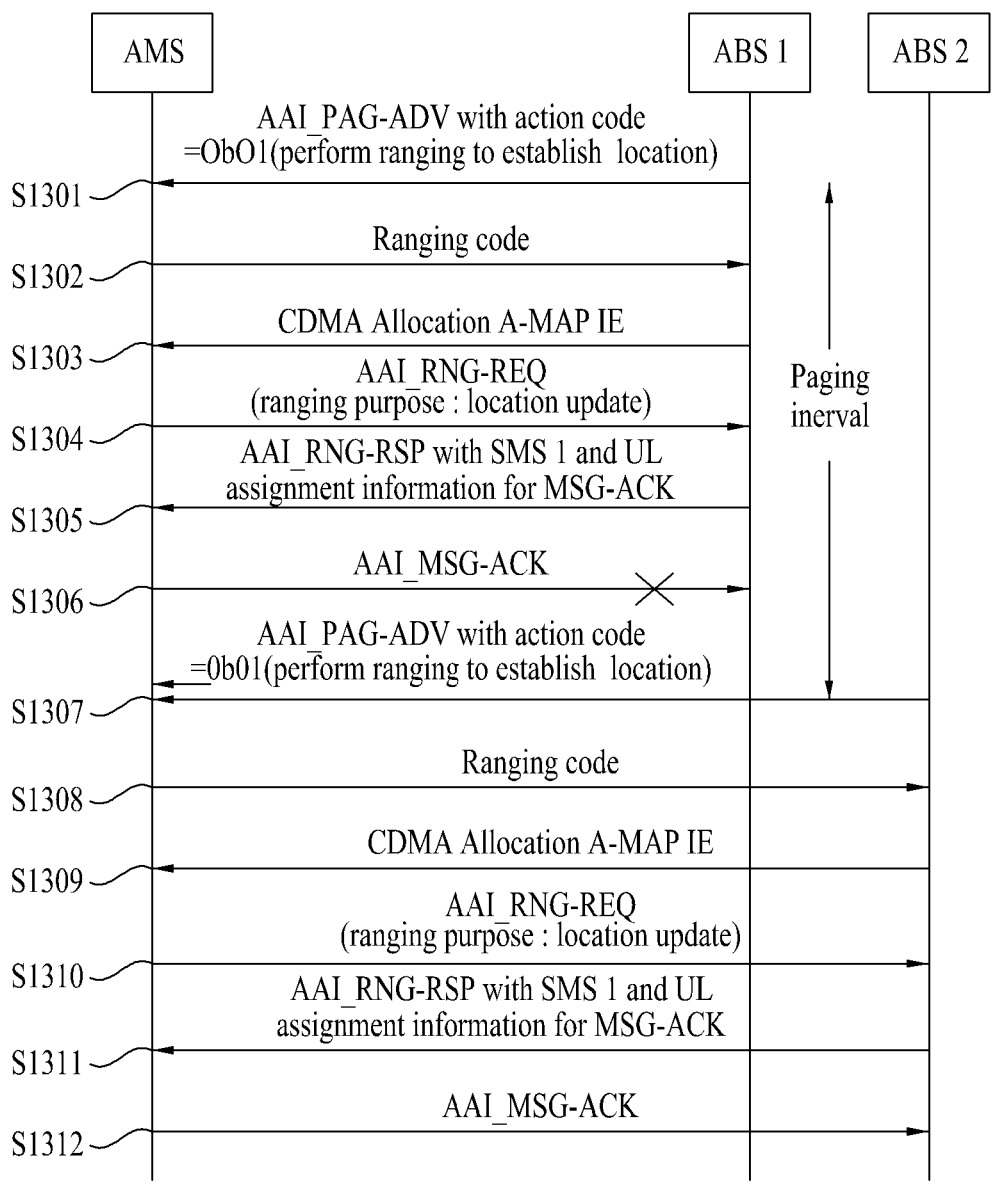
FIG. 13 is a diagram illustrating an example of SMS transmission procedure to which identity determination of SMS is applied when initial transmission is successfully performed but a transmitter determines that the initial transmission has been failed in a method for transmitting SMS in accordance with another embodiment of the present invention.

FIG. 13 is a diagram illustrating an example of SMS transmission procedure to which identity determination of SMS is applied when initial transmission is successfully performed but a transmitter determines that the initial transmission has been failed in a method for transmitting SMS in accordance with another embodiment of the present invention.

In FIG. 13, since step S1301 to step S1306 are similar to the step S1001 to the step S1006 of FIG. 10, the repeated description will be omitted for conciseness of the specification. The base station 1 transmits AAI_RNG-RSP message, which includes SMS of which SMS index value is 1, to the mobile station (S1305). The mobile station successfully receives the AAI_RNG-RSP message from the base station 1 and notifies the base station 1 of the successfully reception through the AAI-MSG-ACK message but the base station 1 fails to receive the AAI_MSG-ACK message (S1306). Accordingly, the base station 1 determines that transmission of the SMS having SMS index of 1 has been failed.

Afterwards, the mobile station receives a paging advertisement message indicating that location update within the region of the base station 2 should be performed (S1307), and performs a ranging process for location update with the base station 2 (S1308 to S1311). At this time, in the SMS included in the AAI_RNG-RSP message at the step S1311, the SMS index is set to 1. This is because that SMS transmission of the base station 1 has been failed.

The mobile station again transmits the AAI-MSG-ACK message to the base station by using the uplink resource allocated through the AAI_RNG-RSP message. Since the SMS received at the step S1305 has the same SMS index as that of the SMS received at the step S1311, the mobile station may disregard the SMS received at the step S1311 or delete the message received at the step S1305.

Configuration of Mobile Station and Base Station

Hereinafter, a mobile station and a base station (femto BS (PBS) and macro BS (MBS)) for implementing the aforementioned embodiments of the present invention will be described in accordance with further still another embodiment of the present invention.

The mobile station may be operated as a transmitter on an uplink and as a receiver on a downlink. Also, the base station may be operated as a receiver on the uplink and as a transmitter on the downlink. In other words, each of the mobile station and the base station may include a transmitter and a receiver for transmission of information or data.

The transmitter and the receiver may include a processor, modules, parts, and/or means for implementing the embodiments of the present invention. Especially, the transmitter and the receiver may include a module (means) for encrypting messages, a module for interpreting encrypted messages, an antenna for transmitting and receiving messages, etc. An example of the transmitter and the receiver will be described below with reference to FIG. 14.

Figure 14:
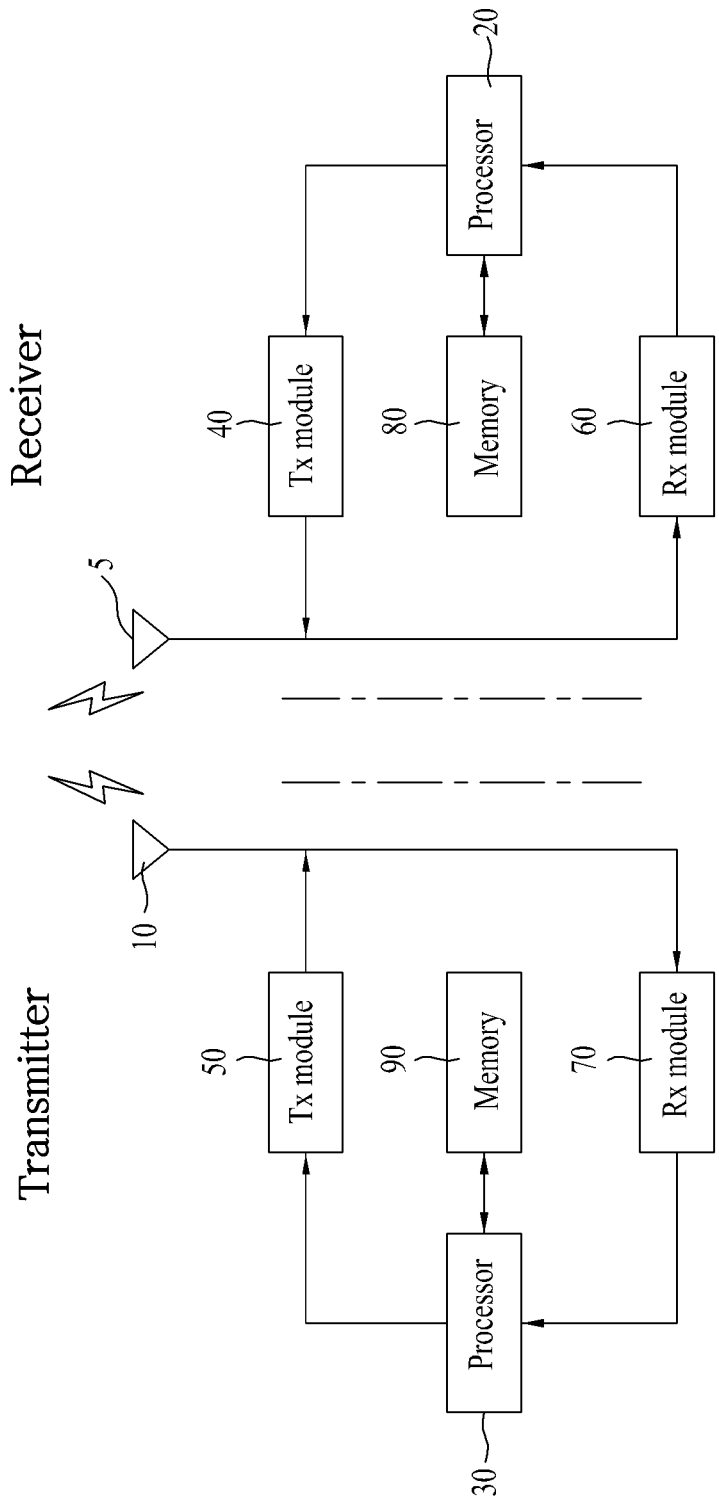
FIG. 14 is a block diagram illustrating a transmitter and a receiver in accordance with still another embodiment of the present invention.

FIG. 14 is a block diagram illustrating an example of a transmitter and a receiver according to further still another embodiment of the present invention.

Referring to FIG. 14, the left part corresponds to the structure of the transmitter and the right part corresponds to the structure of the receiver. Each of the transmitter and the receiver may include an antenna 5 or 10, a processor 20 or 30, a Transmission (Tx) module 40 or 50, a Reception (Rx) module 60 or 70, and a memory 80 or 90. The components of the transmitter are complementary to those of the receiver. The components of the transmitter and the receiver will be described below in more detail.

The antenna 5 or 10 serves to transmit signals generated from the Tx module 40 or 50 or externally receive radio frequency (RF) signals and transfer the received RF signals to the Rx module 60 or 70. If a Multiple Input Multiple Output (MIMO) function is supported, two or more antennas may be provided.

The antenna, the Tx module, and the Rx module may together constitute an RF module.

The processor 20 or 30 generally controls the overall operation of the mobile station. For example, the processor 20 or 30 may perform a controller function for implementing the aforementioned embodiments of the present invention, a variable Medium Access Control (MAC) frame control function based on service characteristics and a propagation environment, a handover (HO) function, an authentication and encryption function, etc. In more detail, the processor 20 or 30 may provide overall control to perform the aforementioned system information transmission/update procedure.

In particular, the processor of the mobile station may perform a ranging process for location update if it is required to perform location update through a paging advertisement message during operation in an idle mode, and may notify the base station of SMS reception if it receives SMS through AAI_RNG-RSP message during a ranging process. At this time, in order to notify the base station that the SMS has been received, HARQ feedback information and AAI_MSG-ACK message transmitted through an uplink resource indicated by uplink allocation information included in the AAI_RNG-RSP message may be used. Alternatively, the processor of the mobile station may implicitly determine a resource region for transmitting the AAI_MSG-ACK message by referring to resource region information for the AAI_RNG-REQ message and resource region information for the AAI_RNG_RSP message.

Also, if SMS index is included in the SMS, the processor of the mobile station may determine identity of the SMS by comparing SMS index of the previously received SMS with SMS index of the currently received SMS.

In addition, the processor of the mobile station may perform the overall control for the operation procedures disclosed in the aforementioned embodiments.

The Tx module 40 or 50 may perform predetermined coding and modulation for data, which are scheduled from the processor 20 or 30 and will be transmitted to the outside, and then may transfer the coded and modulated data to the antenna 10.

The Rx module 60 or 70 may recover original data by decoding and demodulating data received through the antenna 5 or 10 and provide the recovered data to the processor 20 or 30.

The memory 80 or 90 may store programs for processing and control of the processor 20 or 30 and temporarily store input/output (I/O) data. Also, the memory 80 or 90 may include at least one type of storage media such as a flash memory, a hard disk, a multimedia card micro, a card-type memory (e.g. a Secure Digital (SD) or extreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, an optical disc, etc.

In the meantime, the base station may perform a control function for implementing the aforementioned embodiments of the present invention, Orthogonal Frequency Division Multiple Access (OFDMA) packet scheduling, Time Division Duplex (TDD) packet scheduling and channelization, a variable MAC frame control function based on service characteristics and a propagation environment, a real-time high-speed traffic control function, a handover function, an authentication and encryption function, a packet modulation/demodulation function for data transmission and reception, a high-speed packet channel coding function, a real-time MODEM control function, etc., through at least one of the aforementioned modules, or may further include an additional means, module, or part for performing these functions.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned procedure of transmitting SMS more efficiently in a broadband wireless access system and the structure of a mobile station for the same have been described based on the IEEE 802.16m system, they may be applied to various mobile communication systems such as 3GPP/3GPP2 in addition to the IEEE 802.xx system.

The invention claimed is:

1. A method for receiving a short message service (SMS) in a mobile station of a broadband wireless access system, the method comprising the steps of: transmitting a first message for performing ranging to a base station; receiving a second message, which includes SMS information and uplink resource allocation information for transmission of a third message, from the base station in response to the first message; and transmitting a third message, which indicates the state of the reception of the second message, to the base station through uplink resources which are indicated by the uplink resources allocation information;
wherein the mobile station operates in an idle mode, the method further comprising the steps of: receiving a paging advertisement (AAI_PAG-ADV) message indicating that location update should be performed; transmitting a handover ranging code to the base station; and receiving uplink allocation information for transmission of the first message from the mobile station, from the base station; and
wherein the SMS information includes index having different values per SMS, the method further comprising the steps of: comparing an index value of the SMS information included in the second message with an index value of SMS information which is previously received; and deleting the SMS information included in the second message or the previously received SMS information if the index values are the same as each other.

2. The method according to claim 1, if the transmission of the third message is failed, further comprising the steps of performing network reentry to the base station; and receiving the SMS information from the base station through the second message or second layer transmission (AAI_L2-XFER) message.

3. The method according to claim 1, wherein the first message is a ranging request (AAI_RNG-REQ) message, the second message is a ranging response (AAI_RNG-RSP) message, and the third message is a message acknowledgement (AAI_MSG-ACK) message.

4. A method for transmitting a short message service (SMS) from a base station to a mobile station in a broadband wireless access system, the method comprising the steps of: receiving a first message for performing ranging from the mobile station; transmitting a second message, which includes SMS information and uplink resource allocation information for transmission of a third message from the mobile station, to the mobile station in response to the first message; and receiving a third message, which indicates the state of the reception of the second message, from the mobile station through uplink resources which are indicated by the uplink resources allocation information;
wherein the mobile station operates in an idle mode, the method further comprising the steps of: transmitting a paging advertisement (AAI_PAG-ADV) message indicating that location update should be performed, for a paging interval of the mobile station; receiving a handover ranging code from the mobile station; and transmitting uplink allocation information for transmission of the first message from the mobile station, to the mobile station if the ranging code is successfully received; and
wherein the SMS information includes index having different values per SMS, the method further comprising the step of transmitting SMS information having the same index value as that of the SMS information included in the second message to the mobile station for next interval if the third message is not received successfully for the paging interval.

5. The method according to claim 4, if the third message is not received successfully for the paging interval, further comprising the steps of: performing network reentry of the mobile station; and transmitting the SMS information to the mobile station through the second message or second layer transmission (AAI_L2-XFER) message.

6. The method according to claim 4, wherein the first message is a ranging request (AAI_RNG-REQ) message, the second message is a ranging response (AAI_RNG-RSP) message, and the third message is a message acknowledgement (AAI_MSG-ACK) message.

7. A mobile station for receiving a short message service (SMS) in a broadband wireless access system, the mobile station comprising: a processor; and a radio frequency (RF) module for transmitting and receiving a radio signal to and from the outside under the control of the processor, wherein the processor transmits a first message for performing ranging to a base station, receives a second message, which includes SMS information and uplink resource allocation information for transmission of a third message, from the base station in response to the first message, and transmits a third message, which indicates the state of the reception of the second message, to the base station through uplink resources which are indicated by the uplink resources allocation information;
wherein the mobile station operates in an idle mode, and the processor transmits a handover ranging code to the base station if a paging advertisement (AAI_PAG-ADV) message, which indicates that location update should be performed, is received, and receives uplink allocation information for transmission of the first message from the mobile station, from the base station;
wherein the SMS information includes index having different values per SMS, and the processor compares an index value of the SMS information included in the second message with an index value of SMS information which is previously received, and deletes the SMS information included in the second message or the previously received SMS information if the index values are the same as each other.

8. The mobile station according to claim 7, wherein, if the transmission of the third message is failed, the processor performs network reentry to the base station, and receives the SMS information from the base station through the second message or second layer transmission (AAI_L2-XFER) message.

9. The mobile station according to claim 7, wherein the first message is a ranging request (AAI_RNG-REQ) message, the second message is a ranging response (AAI_RNG-RSP) message, and the third message is a message acknowledgement (AAI_MSG-ACK) message.

* * * * *